(12) United States Patent
Krenzer

(10) Patent No.: US 7,070,367 B2
(45) Date of Patent: Jul. 4, 2006

(54) TWIST DRILL FOR DRILLING HAVING A REPLACEABLE DRILL TIP, AND A REPLACEABLE DRILL TIP FOR USE IN A TWIST DRILL

(75) Inventor: Ulrich Krenzer, Zirndorf (DE)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/839,950

(22) Filed: May 6, 2004

(65) Prior Publication Data

US 2004/0208716 A1    Oct. 21, 2004

Related U.S. Application Data

(63) Continuation of application No. 10/061,448, filed on Feb. 1, 2002, now abandoned, which is a continuation-in-part of application No. PCT/EP00/04851, filed on May 27, 2000.

(30) Foreign Application Priority Data

Aug. 3, 1999   (DE) ................. 199 36 579

(51) Int. Cl.
   *B23B 51/02*   (2006.01)
(52) U.S. Cl. ............. 408/226; 408/230; 408/233; 408/713
(58) Field of Classification Search ............. 408/144, 408/226, 227, 230, 231, 232, 233, 713
See application file for complete search history.

(56) References Cited

U.S. PATENT DOCUMENTS 756,339 A * 4/1904 Down ................. 408/223
932,071 A    8/1909 Urbscheit
3,153,356 A  10/1964 Dearborn
3,293,727 A  12/1966 Simms
3,359,837 A  12/1967 Andreasson
4,561,812 A  12/1985 Lindén
5,024,563 A   6/1991 Randall
5,114,286 A   5/1992 Calkins
5,154,550 A  10/1992 Isobe et al.

(Continued)

FOREIGN PATENT DOCUMENTS

DE    524677    5/1931

(Continued)

*Primary Examiner*—Daniel W. Howell
(74) *Attorney, Agent, or Firm*—Nils H. Ljungman & Associates

(57) ABSTRACT

A twist drill, having a replaceable drill tip, comprising a drill bit shaft (1), a cutting insert (2) which is detachably fixed thereto and which forms the tip area of the twist drill, and comprises a flute (3) that continues into the cutting insert (2). The cutting insert rests, with a bearing surface (6) extending orthogonal to the center longitudinal axis (8) of the drill bit, on the face (7) of the drill bit shaft (1) and extends with a fixing stud (9), which centrally protrudes from the bearing surface (6), into a receiving recess (10) which is configured complementary thereto and which is provided in the face (7) of the drill bit shaft (1). At least one peripheral section (13) of the fixing stud (9) comprises a first longitudinal section (15) that, with a screw surface (16) which points away from the drill bit shaft (1), which slopes upward to the drill bit tip (5) in a direction of rotation of the drill bit, and which interacts with an opposite surface (19) on the inner wall (14) of the receiving recess (10), merges into a second longitudinal section (17).

23 Claims, 8 Drawing Sheets

U.S. PATENT DOCUMENTS

| | | |
|---|---|---|
| 5,228,812 A | 7/1993 | Noguchi et al. |
| 5,863,162 A | 1/1999 | Karlsson et al. |
| 5,904,455 A | 5/1999 | Krenzer et al. |
| 5,957,631 A | 9/1999 | Hecht |
| 5,980,166 A | 11/1999 | Ogura |
| 5,988,953 A | 11/1999 | Berglund et al. |
| 6,012,881 A | 1/2000 | Scheer |
| 6,059,492 A | 5/2000 | Hecht |
| 6,071,045 A | 6/2000 | Janness |
| 6,109,841 A | 8/2000 | Johne |
| 6,276,879 B1 * | 8/2001 | Hecht .................. 409/234 |
| 6,283,682 B1 * | 9/2001 | Plummer .................. 408/57 |
| 6,582,164 B1 * | 6/2003 | McCormick .............. 408/226 |

FOREIGN PATENT DOCUMENTS

| | | |
|---|---|---|
| DE | 195 43 233 A1 | 5/1997 |
| DE | 199 45 097 A1 | 3/2001 |
| EP | 0 118 806 | 9/1984 |
| FR | 907980 | 3/1946 |
| WO | WO 96/11079 | 4/1996 |
| WO | WO 98/53943 | 12/1998 |

* cited by examiner

TWIST DRILL FOR DRILLING HAVING A REPLACEABLE DRILL TIP, AND A REPLACEABLE DRILL TIP FOR USE IN A TWIST DRILL

CONTINUING APPLICATION DATA

This application is a continuation of U.S. Ser. No. 10/061,448, filed on Feb. 1, 2002, now abandoned which is a continuation-in-part of International Application No. PCT/EP00/04851, filed on May 27, 2000, which claims priority from Federal Republic of Germany Application No. 199 36 579.2, filed on Aug. 3, 1999. International Application No. PCT/EP00/04851 was pending as of the filing date of this application. The United States was an elected state in International Application No. PCT/EP00/04851.

BACKGROUND OF THE INVENTION

1. Field of the Invention

The invention relates to a twist drill for drilling having a replaceable drill tip. This invention further relates to a replaceable drill tip for use in a twist drill Additionally, this invention relates to a drill bit with a replaceable drill bit.

2. Background Information

The modern metalworking trade primarily uses twist drills to make borings. Depending on the application, these twist drills can differ in terms of their cutting material and geometry. The cutting material traditionally used is increasingly being replaced by different types of cutting material that have a significantly higher resistance to abrasion. For large drilling tools, however, a drill made entirely of such abrasion-resistant materials is generally too expensive, and is not economical in spite of its excellent cutting performance. Alternatives are twist drills in which a drill tip made of abrasion-resistant materials is permanently attached to a carrier tool which is generally made of cheaper, more traditional materials. The disadvantage of these tools, however, is that they can be repointed only to a restricted extent. As soon as the short cutting portion made of abrasion-resistant materials has been used up, the entire tool has to be scrapped.

To reduce overall costs and reduce or eliminate waste of material, it is advantageous to construct a drill with a replaceable cutting tip, as discussed herein. Replaceable cutting tips permit a user to replace the cutting tip when the cutting tip is worn down without having to replace the entire drill.

On a drill bit of this type, a cutting head is detachably fixed to a drill shaft. German Patent No. 196 05 157 A1 describes a drilling tool of the prior art in which the cutting head projects by means of a stud into a receiving recess on the face of the drill shaft, where it is fixed in position with a screw that is oriented at a right angle to the longitudinal axis of the drill. On a drilling tool of the prior art described in WO 98/53943, the drilling head is fixed in position in the drill shaft with a force fit that acts in the axial direction and in the direction of rotation of the drill.

OBJECT OF THE INVENTION

One object of the invention is to develop a twist drill for drilling having a replaceable drill tip, as well as a replaceable drill tip for use in a twist drill.

Another object of the invention is to propose a drill bit with an alternative fixing of the cutting head.

SUMMARY OF THE INVENTION

This object can be accomplished in a drill bit with a drill bit shaft and a cutting insert that forms the tip area of the drill bit and is detachably fixed to the drill bit shaft. There is at least one chip flute that is located in the drill bit shaft and extends into the cutting insert. The cutting insert is in contact with a bearing surface on the face of the drill shaft and extends with a fixing stud that projects centrally from the bearing surface into a receiving recess, which is configured complementary thereto in the face of the drill shaft. At least one peripheral segment of the fixing stud has a first longitudinal segment which merges with a screw surface into a second longitudinal section. The screw surface points away from the drill shaft, slopes upward in the direction of rotation of the drill bit toward the drill bit tip, and interacts with an opposite surface on the inner wall of the receiving recess.

The cutting head is in contact with a bearing surface against the face of the drill shaft, and extends by means a fixing stud that projects centrally out of the bearing surface into a complementary receiving recess in the face of the drill shaft. The peripheral area of the fixing stud that interacts with the inner wall of the recess has two longitudinal segments, namely a first longitudinal segment which, with a screw surface that points toward the drill tip, slopes upward in the direction of rotation of the drill and interacts with an opposite surface on the inner wall of the receiving recess and merges into a second longitudinal segment. When the drill head is designed in this manner, it can be easily inserted with its fixing stud into the receiving recess and fixed in position opposite to the direction of rotation of the drill. The screw surface is thereby pushed onto the opposite surface of the receiving recess and the cutting head is pressed with its bearing surface onto the face of the drill shaft. This fixing is further strengthened when the drill is in operation.

In one preferred embodiment, the second longitudinal segment of the fixing stud tapers toward its free end. The receiving recess becomes narrower by the same extent toward its base. The shaft walls that are adjacent to the receiving recess can be correspondingly thicker and more stable in this area. The tool shaft is therefore more stable with regard to a force that is exerted on the cutting head at a right angle to the longitudinal axis of the drill than would be the case with a receiving recess that becomes wider toward its base in an approximately swallowtail shape. A particularly stable mounting and centering of the fixing stud in the receiving recess is essentially guaranteed if the free end of the fixing stud is provided with a cylindrical peripheral surface and the area adjacent to it and extending to the screw surface is provided with a conical peripheral surface.

To limit the axial strain between the cutting insert and the tool shaft and to create a defined limit position for the cutting insert, in an additional embodiment of the invention, a rotation stop projects from the face of the drill shaft and extends into a complementary recess in the bearing surface of the cutting insert. The bearing surfaces of the drill shaft and the face of the tool shaft also preferably each extend at a right angle to the longitudinal axis of the drill. The screw surface can form an angle of 90° with the longitudinal axis of the drill. The screw surface is preferably oriented at an angle, however, and forms an angle which is <90° and >45°. The angle is preferably 60°. As a result of the inclined position of the screw surface, the cutting insert is pushed, in addition to the axial strain, with a force that centers it and is directed toward the center longitudinal axis of the drill.

In at least one possible embodiment of the present invention, the surfaces of the fixing stud, as well as the surfaces of the drill bit shaft that engage with the surfaces of the fixing stud, can preferably be suitably designed to withstand torque and axial forces. During drilling of an object, torque forces are exerted on a drill. In addition, axial forces may push and pull on the drill in the direction along the longitudinal axis of the drill, especially during retraction of the drill from an object being drilled. The peripheral segments of the fixing stud may therefore preferably be designed to withstand such forces since the peripheral segments may essentially perform a retaining function preferably to prevent the cutting insert from being pulled from the drill shaft during drilling. Conversely, in at least one possible embodiment of the present invention, the inner surfaces of the drill shaft may also be designed preferably to withstand the forces that are acting on the cutting insert to also substantially prevent the cutting insert from being pulled from the drill shaft. Further, since the cutting insert may essentially be screwed into place in the drill shaft in a direction opposite the direction of rotation of the drill, torque forces may be exerted on the cutting insert. According to at least one possible embodiment of the present invention, the inner surfaces of the drill shaft against which the sides of the cutting insert rest preferably must be suitably designed to essentially prevent the cutting insert from being further screwed into the shaft, which would most likely result in damage of the shaft and the insert. By strengthening the contact surfaces of the shaft and the cutting insert, the torque and axial forces can be substantially withstood to prevent damage to the drill.

In at least one other possible embodiment of the present invention, the chip flutes of the drill bit may each be divided into essentially two portions: the portion of the chip flute on the drill shaft and the portion of the chip flute on the cutting insert. When the cutting insert is screwed into the drill shaft, the two chip flute portions can be aligned to form a single chip flute surface. Although it may preferably be desirable to design the cutting insert and the drill shaft such that the chip flute portions are exactly aligned to form a chip flute that is substantially smooth and continuous, such a design may require high precision when manufacturing the cutting inserts and the drill shafts. It is well known, however, that any manufacturing process, no matter how precise, is subject to errors, tolerances and imperfections. It is therefore possible that the cutting inserts may not be precisely manufactured due to the inherent imperfections that occur during any manufacturing process. To account for such imperfections that may occur, in one possible embodiment of the present invention it may not be necessary to have precisely aligned chip flute portions. Since the chip flute portions may simply serve to remove chips, exact precision in their design may not be a requirement for proper operation of the drill. Further, the centering of the drill tip is often more important to a drilling process than the precise design of the chip flutes, since an off-center drill tip will often produce a wobbling motion of the drill during drilling, which is in many cases undesirable. The central fixing stud of the cutting insert can provide a centering function that essentially centers the drill tip along the central longitudinal axis of the drill bit. The present invention, in at least one possible embodiment, therefore teaches that as long as the drill tip of the cutting insert is designed to lie on the central longitudinal axis, it may be possible for the chip flute portions to be slightly misaligned without substantially affecting the performance of the drill.

Drills such as the type described above may be used, in at least one possible embodiment, to cut various materials, such as metals, wood, plastics, composites, polymers, steel, and other hard materials. In addition, such drills may also possibly be used in machine-operated, automatic drilling systems, such as numerically-controlled drilling systems on assembly lines. By having replaceable cutting or drilling inserts, it may be possible in at least one possible embodiment of the present invention, to substantially maintain the overall length of the drill by replacing the cutting inserts when they become worn. By substantially maintaining the length of the drill, it may not be necessary to reconfigure or reprogram the machinery using the drill in the automatic drilling process since the drill will not substantially change in length.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the exemplary embodiments illustrated in the accompanying drawings, in which.

DESCRIPTION OF THE PREFERRED EMBODIMENT

Figure 1:
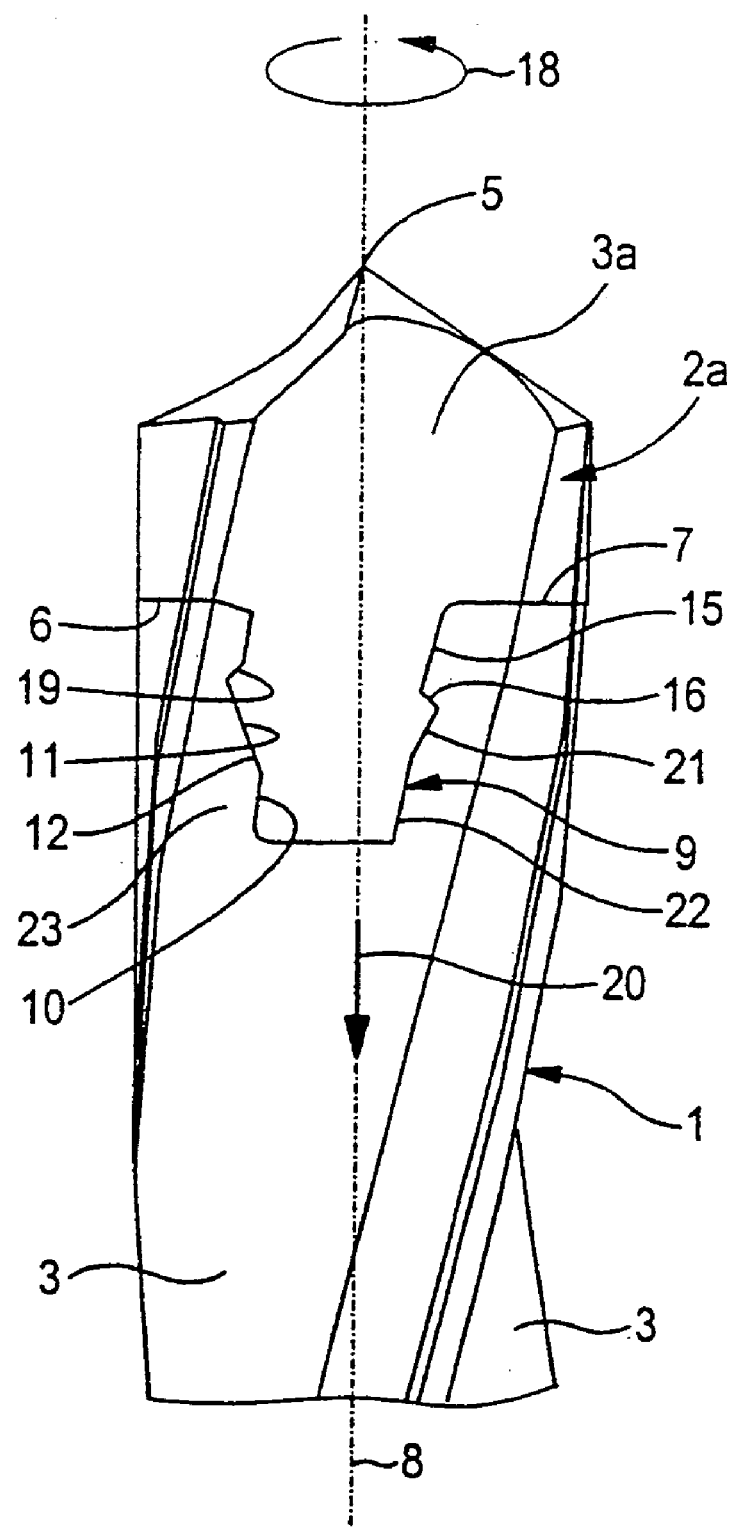
FIG. 1 shows the upper segment of a drill bit with three chip flutes and a corresponding three-edged cutting insert, in a side view.

The drill bits illustrated in the accompanying drawings are composed of a drill shaft 1 and a cutting insert 2. The cutting insert 2a on the drill illustrated in FIGS. 1 to 5 is three-edged. Accordingly, there are a total of three chip flutes 3 in the drill shaft 1, which continue with chip flute segments 3a into the cutting insert 2a. The cutting insert has three major cutting edges 4 which—as can be seen in particular in the plan view from overhead in FIG. 3—are oriented in approximately a star shape and converge in the drill tip 5. The three edges of the cutting insert mean that the cutting insert, likewise shown in the plan view from overhead in FIG. 3, has approximately the shape of a trifurcated star.

The cutting insert 2a has a flat bearing surface 6, which is in flat contact against the face 7 of the drill shaft 1. The bearing surface 6 and the face 7 extend at aright angle with respect to the center longitudinal axis 8 of the drill bit. Shaped onto the bearing surface 6 is a central fixing stud 9, which extends in the direction of the center longitudinal axis 8. When the drill bit is inserted, the fixing stud 9 lies in a complementary configured receiving recess 10 in the drill shaft 1, where it is effectively fixed by axial undercuts. The receiving recess 10 emerges into the chip flutes 3 with lateral openings 11 that extend to the face 7. When the drill bit is inserted as illustrated in FIG. 1, the cutting surface areas that form the chip flute segments 3a and the chip flute 3 of the drill shaft 1 are aligned with one another, whereby they are interrupted only by the joint 12 between the cutting insert 2a and the drill shaft 1.

The chip flute segments 3a divide the fixing stud 9 into three peripheral segments 13, which interact with the inside walls 14 of the receiving recess 10. The fixing stud 9 has a first longitudinal segment 15 which merges with a screw surface 16 into a second longitudinal segment 17. The screw surface 16 points toward the drill tip 5 and projects in the manner of a radial shoulder from the peripheral segment 13. The screw surface 16 slopes upward in the direction of rotation 18 of the drill bit toward the drill tip 5 and interacts with a complementary configured opposite surface 19 on the inside walls 14 of the receiving recess 10. To essentially fix the cutting insert to the drill shaft 1, the cutting insert is inserted with the fixing stud 9 into the receiving recess 10 so that its peripheral segments 13 are located in the vicinity of the openings 11. As the result of a rotation in the direction opposite to the direction of rotation 18 of the drill bit, the screw surfaces 16 arrive below the opposite surfaces 19 on the inner walls 14, as a result of which the cutting insert is pressed in the direction indicated by the arrow 20 with its bearing surface 6 against the face 7.

Figure 6:
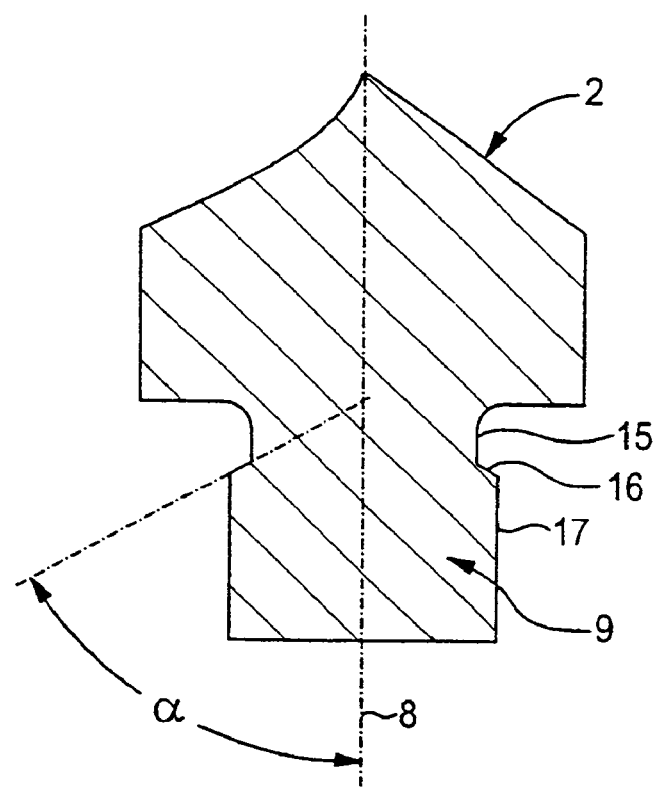
FIG. 6 shows an additional embodiment of a cutting insert in longitudinal section.
Figure 7:
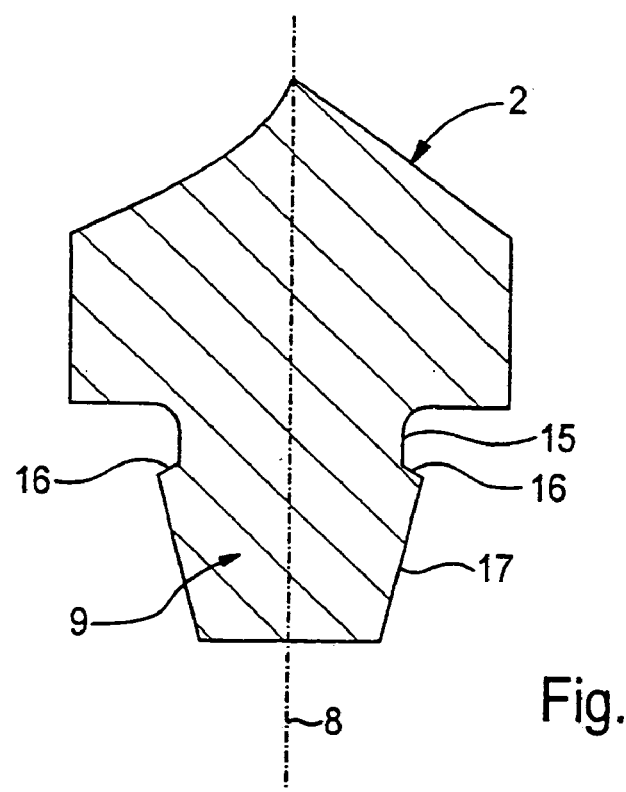
FIG. 7 shows an additional embodiment of a cutting insert in longitudinal section.

The surface of the second longitudinal segment 17 that interacts with the inner walls 14 can be a partly cylindrical surface as illustrated in FIG. 6. In the exemplary embodiment illustrated in FIG. 7, the second longitudinal segment 17 tapers conically toward the drill shaft. However, special preference is given to the configuration illustrated in FIG. 2, in which adjacent to the screw surface 16 there is a conical segment 21, which merges into a cylindrical segment 22. The screw surface 16 and the conical segment 21 together form a screw-threadlike projection that is asymmetrical. The screw surface 16 and the conical segment 21 both form different angles with respect to the longitudinal axis 8 which results in the projection being asymmetrical. The cylindrical segment 22 effects a centering of the cutting insert 2a in the receiving recess 10. The diameter of the cylindrical segment 22 can be relatively small compared to the segments adjacent to it toward the tip and that have the screw surfaces 16 necessary for the axial bracing. Accordingly, the area 23 of the receiving recess 10 that interacts with the cylindrical segment 22 can also have a small inside diameter. That in turn means a greater wall thickness 24 in the area 23 and thus increased stability. Especially in the area 23 have a greater effect on account of the lever effect. However, the greater wall thickness 24 in this area guarantees increased stability of the drill shaft 1.

To further explain, the torque forces act on the cutting insert 2a during a drilling procedure. Due to the lever effect, a large portion of the torque forces are exerted at the transition between the bearing surface 6 and the first longitudinal segment 15. Therefore, it is advantageous for the fixing stud 9 to have an increased thickness at that particular area. Further, since the majority of the torque forces are concentrated on that particular area, it is possible for the fixing stud 9 to decrease in thickness in the area of the cylindrical segment 22. In addition, by decreasing the thickness of the fixing stud 9, it is thereby possible to have an increased thickness of the shaft 1 in the area 23. As torque forces are exerted on the cutting insert 2a, force is also exerted on the portions of the shaft 1 about the recess 10. Also due to the lever effect, the majority of the force is exerted on the area 23 near the bottom of the recess 10. By decreasing the thickness of the fixing stud 9 at the area 23, the wall thickness 24 can be consequently increased to compensate for the greater torque forces exerted in that particular area 23. The lever effect therefore can be accounted for by increasing thickness of the shaft 1 and the fixing stud 9 at the areas where the concentration of force is the greatest.

The screw surfaces 16 on the fixing stud 9 of a cutting insert 2 can basically form an angle of 90° with the center longitudinal axis 8 of the drill or of the cutting insert. However, preference is given to screw surfaces 16 that are oriented at an angle and form an angle $\alpha$ with the center longitudinal axis 8 which is <90° and $\geq$45°.

FIGS. 8 to 12 show a drill bit with two chip flutes and accordingly a two-edged cutting insert 2b. The configuration of the fixing stud 9 and of the receiving recess 10 of this drill bit is the same as that of the drill bit described above. One difference is that two rotation stops 25 project from the face 7a of the drill shaft 1. The rotation stops 25 are diametrically opposite each other and are realized with four surfaces in an essentially wedge shape. Their outside surface 26 is formed by the peripheral surface of the drill shaft 1. Their inside surface 27 interacts with a complementary configured opposite surface 28, which is part of the wall of a recess 29 in the bearing surface 6 of the cutting insert 2b, which recess 29 holds the rotation stop 25. The rotation stops also have two inclined surfaces, whereby the one inclined surface 30 points in the direction of rotation 18 of the drill bit and merge into a face 7a. The other inclined surface 31 points opposite to the direction of rotation 18 of the drill bit and is a partial surface of the face 32 that forms the chip flute 3. The inclined surface 30 interacts with an inclined surface 33 that is formed from the wall of the recess 29 and acts as an opposite bearing surface.

Figure 2:
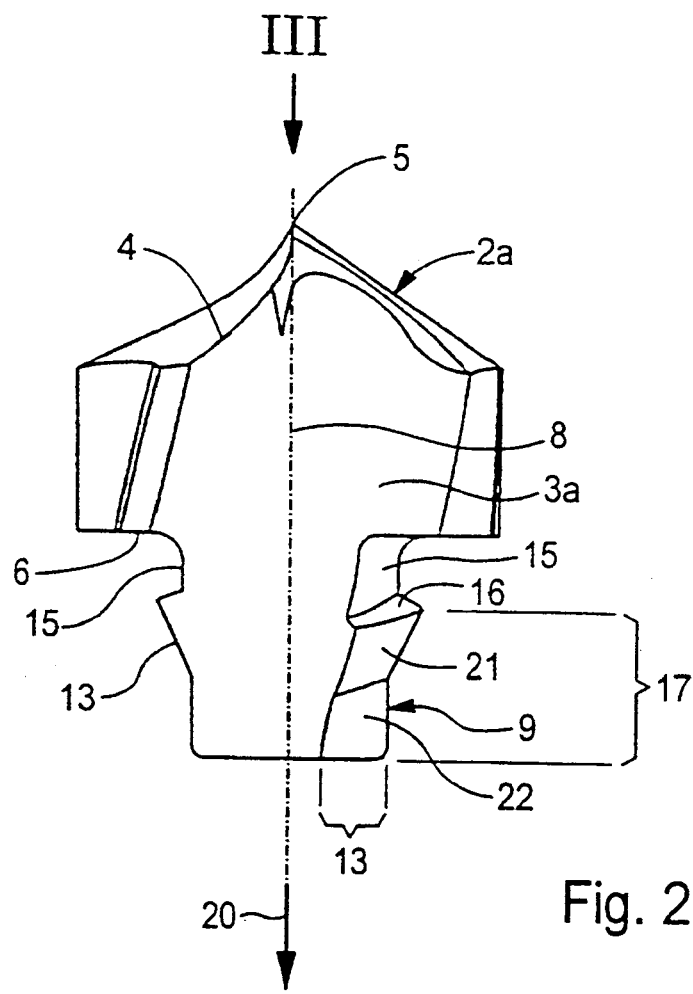
FIG. 2 is a side view of the cutting insert illustrated in FIG. 1.
Figure 3:
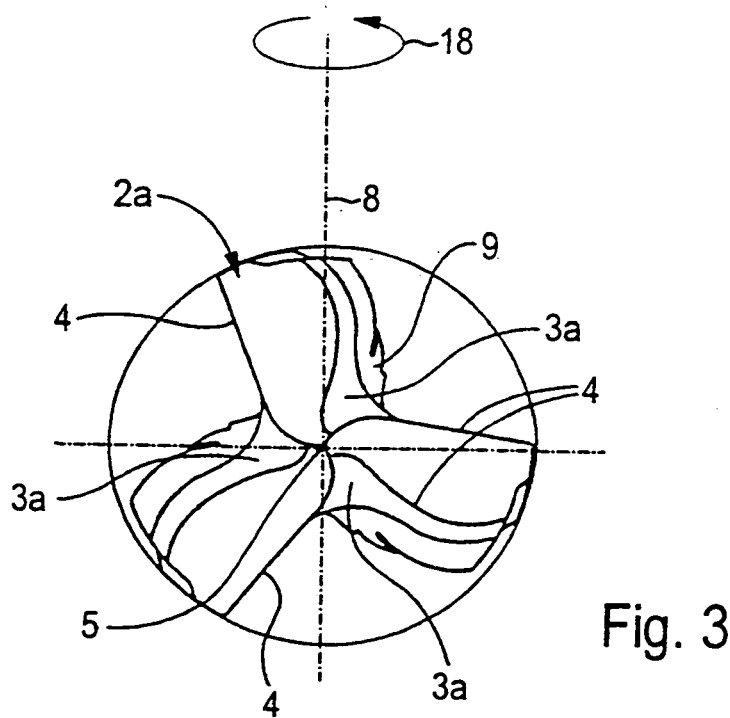
FIG. 3 is a plan view from overhead of the cutting insert in the direction of the arrow III in FIG. 2.
Figure 4:
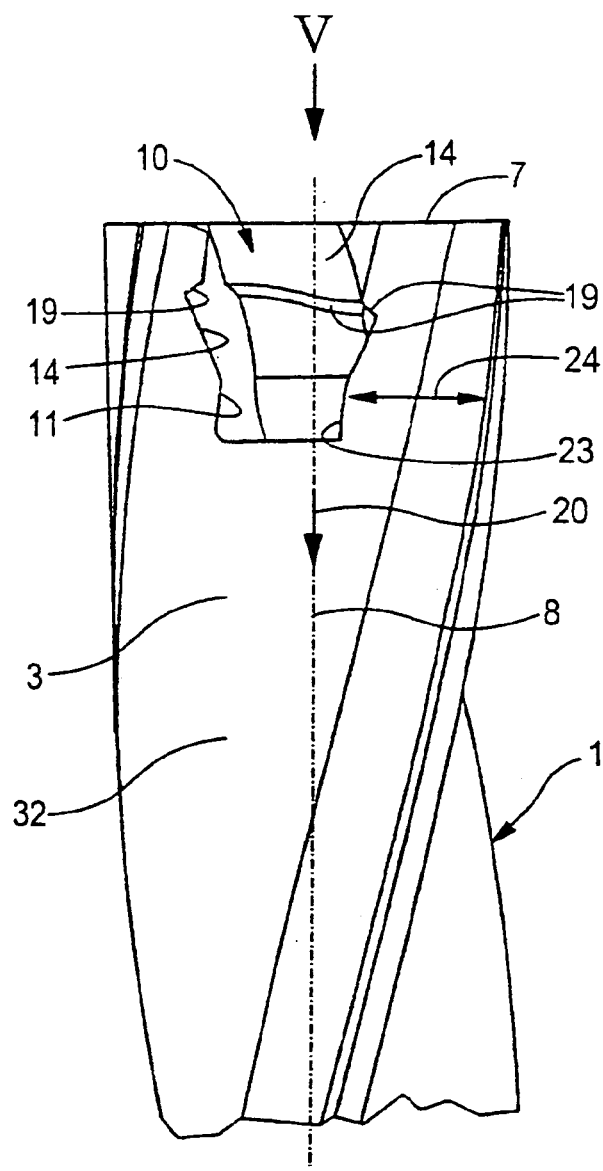
FIG. 4 is a side view of a drill shaft as illustrated in FIG. 1, with the cutting insert removed.
Figure 5:
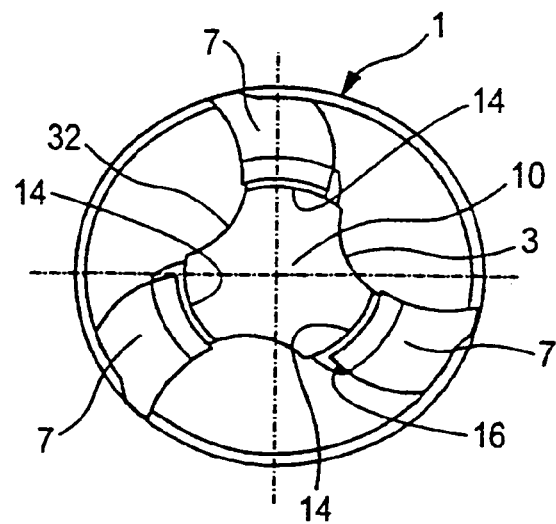
FIG. 5 is a plan view from overhead of the face of the tool shaft in the direction of the arrow 5 in FIG. 4.
Figure 8:
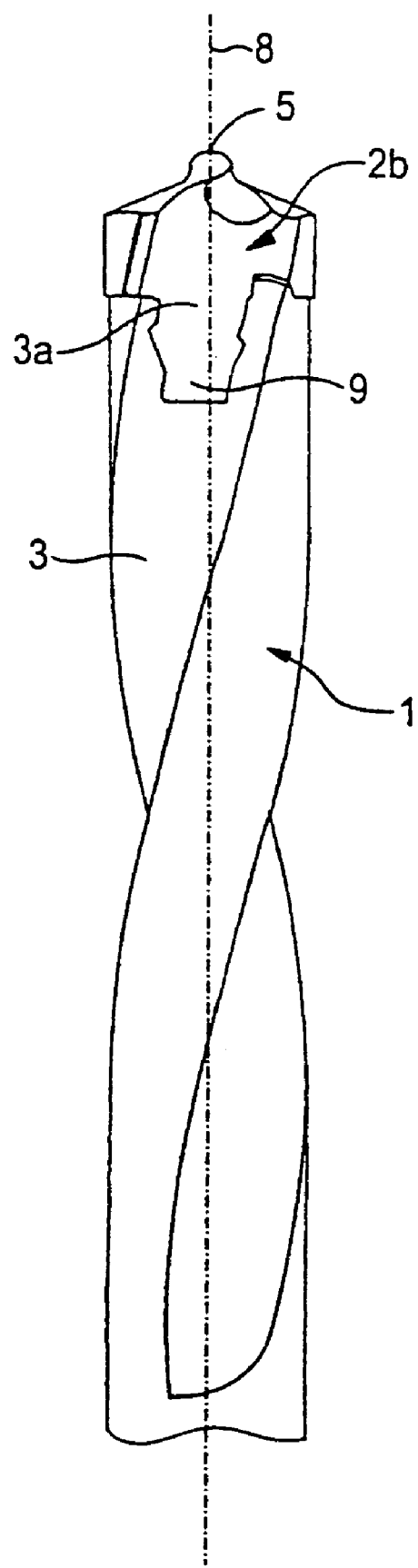
FIG. 8 is a side view of the upper portion of a drill bit with a two-edged cutting insert.
Figure 9:
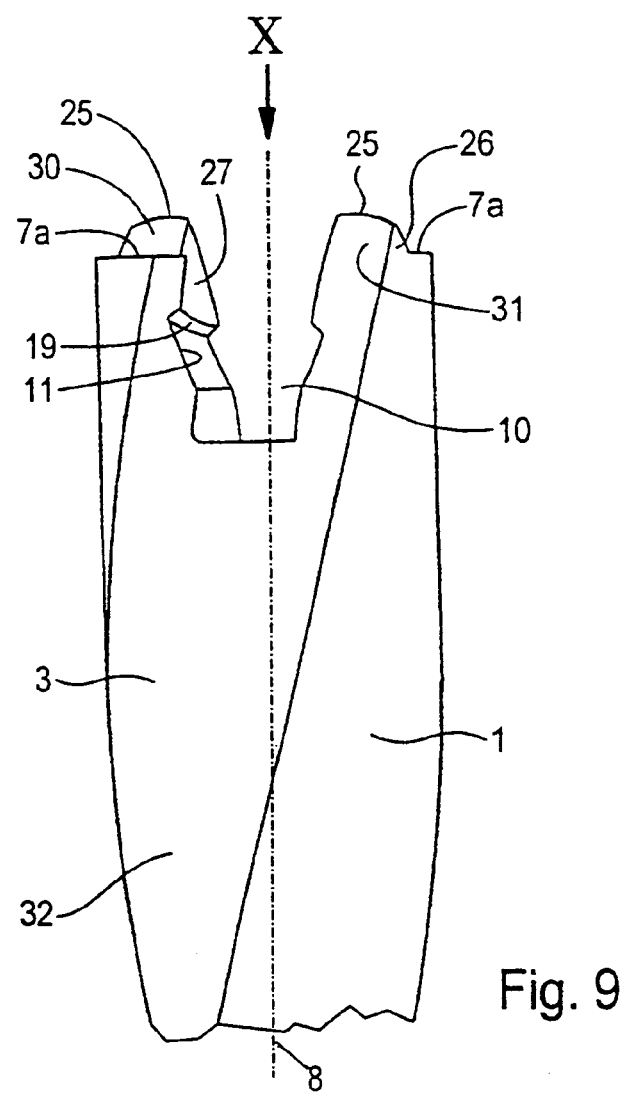
FIG. 9 is a side view of the upper longitudinal segment of the drill with the cutting insert removed.
Figure 10:
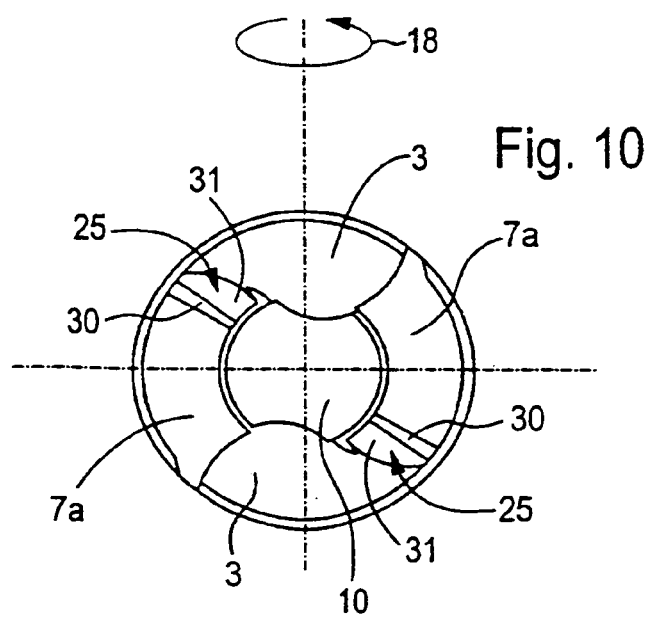
FIG. 10 is a plan view from overhead in the direction of the arrow X in FIG. 9.
Figure 11:
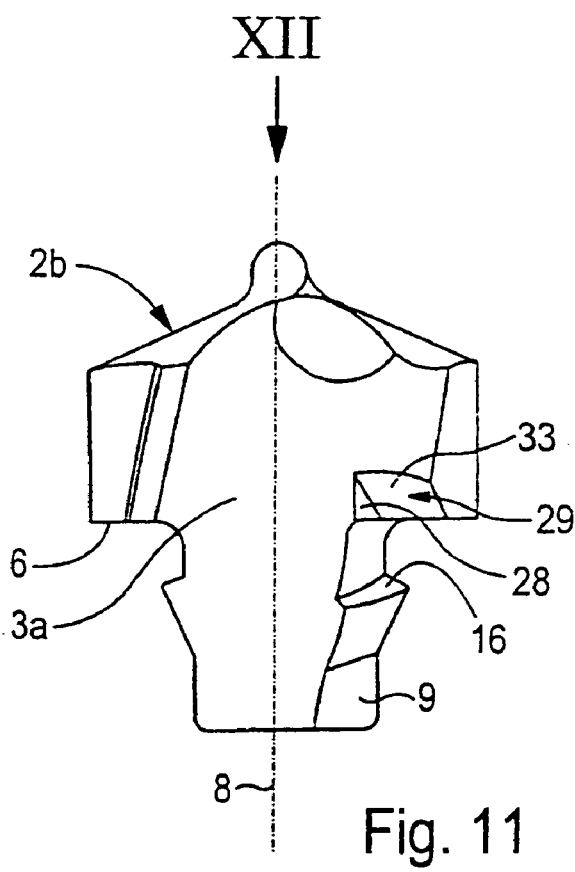
FIG. 11 shows a two-edged cutting insert in a side view.
Figure 12:
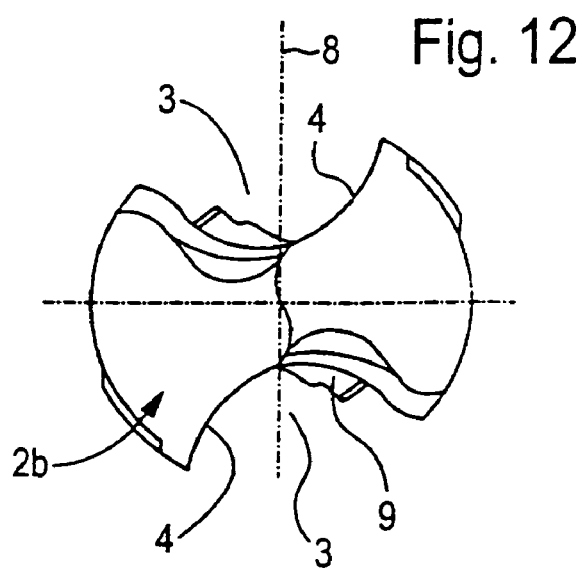
FIG. 12 is a plan view from overhead in the direction indicated by the arrow XII in FIG. 11.
Figure 13:
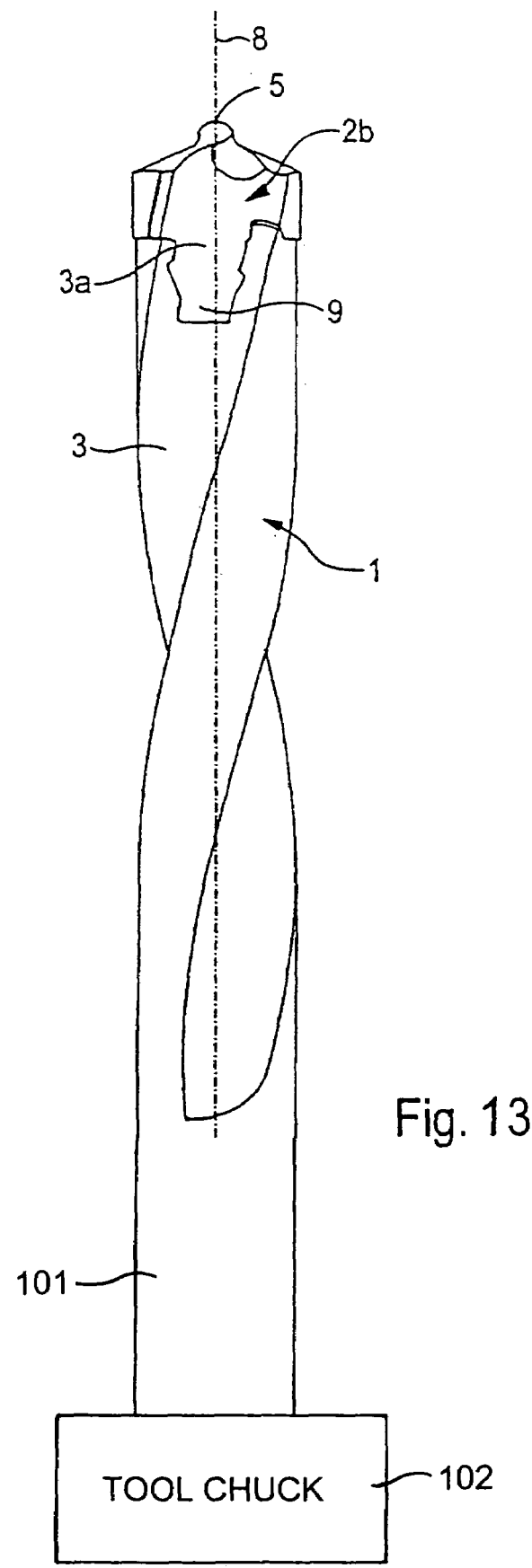
FIG. 13 is a view of the drill in FIG. 8 with additional features according to at least one possible embodiment of the present invention.

FIG. 13 is a view of the drill shown in FIG. 8 with additional features according to at least one possible embodiment of the present invention. The drill bit has a drill shank portion 101 that is inserted into a tool chuck 102. The tool chuck 102 holds the drill bit and provides a driving force to rotate the drill during a drilling process. The drill shown has a two-edged cutting insert design, but is not the only possible embodiment. This drill bit and chuck configuration may also be used with cutting inserts and bits with more than two edges, such as a cutting insert with three edges, as shown in FIGS. 1–3.

One feature (or aspect) of an embodiment of the invention resides broadly in a drill bit with a drill bit shaft (1) and a cutting insert that forms the tip area of the drill bit and is detachable fixed to the drill bit shaft, and at least one chip flute (3) that is located in the drill bit shaft (1) and extends into the cutting insert (2), whereby the cutting insert is in contact with a bearing surface (6) on the face (7) of the frill shaft (1) and extends with a fixing stud (9) that projects centrally from the bearing surface (6) into a receiving recess (10) which is configured complementary thereto in the face (7) of the drill shaft (1), characterized by the fact that at least one peripheral segment (13) of the fixing stud (9) has a first longitudinal segment (15) which with a screw surface (16) that points away from the drill shaft (1), slopes upward in the direction of rotation (18) of the drill bit toward the drill bit tip (5) and interacts with an opposite surface (19) on the inner wall (14) of the receiving recess (10), merges into a second longitudinal section (17).

Another feature (or aspect) of an embodiment of the invention resides broadly in a drill bit, characterized by the fact that the second longitudinal segment (17) tapers toward its free end.

Yet another feature (or aspect) of an embodiment of the invention resides broadly in a drill bit, characterized by a first stud segment (22) forming the free end with a cylindrical peripheral surface, and a second segment (21) that has a conical peripheral surface and extends to the screw surface (16).

Still another feature (or aspect) of an embodiment of the invention resides broadly in a drill bit characterized by a rotation stop (25) that projects from the face (7) of the drill shaft (1) and projects into an essentially complementary shaped recess in the bearing surface (6) of the cutting insert (2).

A further feature (or aspect) of an embodiment of the invention resides broadly in a drill bit, characterized by the fact that the screw surface (16) forms an angle ($\alpha$) of 90° to 45° with the longitudinal axis (8) of the drill bit.

Another feature (or aspect) of an embodiment of the invention resides broadly in a drill bit, characterized by an angle ($\alpha$) of 60°.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Application No. 199 36 579.2, filed on Aug. 3, 1999, having inventor Ulrich KRENZER, and DE-OS 199 36 579.2, having inventor Ulrich KRENZER, and DE-PS 199 36 579.2, having inventor Ulrich KRENZER, and International Application No. PCT/EP00/04851, filed on May 27, 2000, having inventor Ulrich KRENZER, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The details in the patents, patent applications and publications may be considered to be incorporable, at applicant's option, into the claims during prosecution as further limitations in the claims to patentably distinguish any amended claims from any applied prior art.

The following U.S. Patents regarding drills and/or drill inserts are hereby incorporated by reference as if set forth in their entirety herein: U.S. Pat. No. 5,800,100, issued to Krenzer on Sep. 1, 1998; issued to Kammermeier on Nov. 3, 1998; U.S. Pat. No. 5,967,710, issued to Krenzer on Oct. 9, 1999; U.S. Pat. No. 6,045,301, issued to Kammermeier et al. on Apr. 4, 2000; U.S. Pat. No. 6,116,825, issued to Kammermeier et al. on Sep. 12, 2000; U.S. Pat. No. 6,164,879, issued to Krenzer on Dec. 26, 2000; U.S. Pat. No. 6,210,083, issued to Kammermeier et al. on Apr. 3, 2001; U.S. Pat. No. 6,231,276, issued to Müller et al. on May 15, 2001; U.S. Pat. No. 5,904,455, issued to inventors Krenzer et al. on May 18, 1999; and U.S. Pat. No. 6,309,149, issued to inventor BORSCHERT on Oct. 30, 2001.

The following U.S. Patent Applications regarding drills and/or drill inserts are hereby incorporated by reference as if set forth in their entirety herein: Ser. No. 09/521,134, having inventors Gebhard MÜLLER and Horst JAGER, filed on Mar. 8, 2000; Ser. No. 09/927,921, having inventors Bernhard Walter BORSCHERT, Jochen STIES, Dieter Hermann MUHLFRIEDEL, and Karl-Heinz WENDT, filed on Aug. 10, 2001; Ser. No. 09/935,078, having inventors Hans-Wilm HEINRICH, Manfred WOLF, and Dieter SCHMIDT, filed on Aug. 22, 2001; Ser. No. 09/966,735, having inventor Ulrich KRENZER, filed on Sep. 28, 2001; and Ser. No. 10/008,528, having inventor Rudi HARTLOHNER, filed on Nov. 5, 2001;.

Some examples of twist drills that may possibly be utilized or adapted for use in at least one possible embodiment of the present invention may possibly be found in the following U.S. patents: U.S. Pat. No. 4,209,275, issued to Kim on Jun. 24, 1980; U.S. Pat. No. 4,556,347, issued to Barish on Dec. 3, 1985; U.S. Pat. No. 4,688,972, issued to Kubota on Aug. 25, 1987; U.S. Pat. No. 4,756,650, issued to Wakihira et al. on Jul. 12, 1988; U.S. Pat. No. 4,762,445, issued to Bunting et al. on Aug. 9, 1988; U.S. Pat. No. 5,230,593, issued to Imanaga et al. on Jul. 27, 1993; U.S. Pat. No. 5,350,261, issued to Takaya et al. on Sep. 27, 1994; U.S. Pat. No. 5,442,979, issued to Hsu on Aug. 22, 1995; U.S. Pat. No. 5,678,960, issued to Just et al. on Oct. 21, 1997; U.S. Pat. No. 5,931,615, issued to Wiker on Aug. 3, 1999; and U.S. Pat. No. 6,283,682, issued to Plummer on Sep. 4, 2001.

Some examples of other drills and drill inserts, features of which may possibly be utilized or adapted for use in at least one possible embodiment of the present invention may possibly be found in the following U.S. patents: U.S. Pat. No. 4,072,438, issued to Powers on Feb. 7, 1978; U.S. Pat. No. 4,131,383, issued to Powers on Dec. 26, 1978; U.S. Pat. No. 4,220,429, issued to Powers et al. on Sep. 2, 1980; U.S. Pat. No. 4,563,113, issued to Ebenhoch on Jan. 7, 1986; U.S. Pat. No. 5,173,014, issued to Agapiou et al. on Dec. 22, 1992; U.S. Pat. No. 5,236,291, issued to Agapiou et al. on Aug. 17, 1993; U.S. Pat. No. 5,807,041, issued to Lindblom on Sep. 15, 1998; U.S. Pat. No. 5,947,659, issued to Mays on Sep. 7, 1999; and U.S. Pat. No. 6,071,046, issued to Hecht et al. on Jun. 6, 2000.

Some examples of drills and/or drill bits with tungsten carbide that may possibly be utilized or adapted for use in at least one possible embodiment of the present invention may possibly be found in the following U.S. patents: U.S. Pat. No. 6,135,218, issued to Deane et al. on Oct. 24, 2000; U.S. Pat. No. 6,029,544, issued to Katayama on Feb. 29, 2000; U.S. Pat. No. 5,979,571, issued to Scott et al. on Nov. 9, 1999; U.S. Pat. No. 5,836,409, issued to Vail, III on Nov. 17, 1998; U.S. Pat. No. 4,241,483, issued to Voitas on Dec. 30, 1980; U.S. Pat. No. 4,200,159, issued to Peschel et al. on Apr. 29, 1980; and U.S. Pat. No. 4,169,637, issued to Voitas on Oct. 2, 1979.

Some examples of drills and/or drill bits with titanium carbide that may possibly be utilized or adapted for use in at least one possible embodiment of the present invention may possibly be found in the following U.S. patents: U.S. Pat. No. 5,882,152, issued to Janitzki on Mar. 16, 1999 and U.S. Pat. No. 4,211,294, issued to Multakh on Jul. 8, 1980.

Some examples of high strength steel that may possibly be utilized or adapted for use in at least one possible embodiment of the present invention may possibly be found in the following U.S. patents: U.S. Pat. No. 4,578,113, issued to Rana et al. on Mar. 25, 1986; U.S. Pat. No. 4,720,307, issued to Matsumoto et al. on Jan. 19, 1988; U.S. Pat. No. 4,814,141, issued to Imai et al. on Mar. 21, 1989; U.S. Pat. No. 4,826,543, issued to Yano et al. on May 2, 1989; U.S. Pat. No. 4,956,025, issued to Koyama et. al. on Sep. 11, 1990; U.S. Pat. No. 5,651,938, issued to Thomson et al. on Jul. 29, 1997; U.S. Pat. No. 5,772,957, issued to Thomson et al. on Jun. 30, 1998; and U.S. Pat. No. 5,798,004, issued to Tamehiro et al. on Aug. 25, 1998.

Some examples of numerical control systems involving drills or drilling processes may possibly be found in the following U.S. Patents: U.S. Pat. No. 6,232,736, entitled "Numerical control machine tool positioning system"; U.S. Pat. No. 6,107,768, entitled "Numerical control apparatus for a machine tool"; U.S. Pat. No. 6,036,347, entitled "Numerical control information generator for controlling machine tool processes which require tool exchanges"; U.S. Pat. No. 5,815,400, entitled "Machining method using numerical control apparatus"; U.S. Pat. No. 5,532,932, entitled "Numerical control unit"; U.S. Pat. No. 5,493,502, entitled "Numerical control unit for controlling a machine tool to machine a workpiece at an instructed feed rate along linear and rotational axes"; U.S. Pat. No. 4,972,322, entitled "Method for preparing numerical control data for a machine tool"; U.S. Pat. No. 4,914,364, entitled "Numerical control apparatus"; U.S. Pat. No. 4,862,380, entitled "Numerical control unit"; U.S. Pat. No. 4,831,906, entitled "Numerical control machine"; U.S. Pat. No. 4,794,311, entitled "Numerical control system"; U.S. Pat. No. 4,788,481, entitled "Numerical control apparatus"; U.S. Pat. No. 4,751,652, entitled "Numerical control drilling restart control system"; U.S. Pat. No. 4,719,579, entitled "Numerical control method"; U.S. Pat. No. 4,667,294, entitled "Numerical control apparatus"; U.S. Pat. No. 4,624,607, entitled "Computed numerical control drilling machine"; U.S. Pat. No. 4,588,339, entitled "Tool holder for a cutting machine provided with numerical control"; U.S. Pat. No. 4,549,270, entitled "Method of controlling selection of tools in a quadriaxial numerical control lathe"; U.S. Pat. No. 4,547,854, entitled "Method of controlling lineup of tools in numerical control machine tool"; U.S. Pat. No. 4,199,814, entitled "Computer numerical control machine tool"; U.S. Pat. No. 4,149,235, entitled "Computer numerical control system for machine tool.

The invention as described hereinabove in the context of the preferred embodiments is not to be taken as limited to all of the provided details thereof, since modifications and variations thereof may be made without departing from the spirit and scope of the invention.

| NOMENCLATURE | |
|---|---|
| 1 | Drill shaft |
| 2 | Cutting insert |
| 3 | Chip flute |
| 3a | Chip flute segment |
| 4 | Major cutting edge |
| 5 | Drill tip |
| 6 | Bearing surface |
| 7 | Face |
| 8 | Center longitudinal axis |
| 9 | Fixing stud |
| 10 | Receiving recess |
| 11 | Opening |
| 12 | Joint |
| 13 | Peripheral segment |
| 14 | Inside wall |
| 15 | First longitudinal segment |
| 16 | Screw surface |
| 17 | Second longitudinal segment |
| 18 | Direction of rotation of drill bit |
| 19 | Opposite surface |
| 20 | Arrow |
| 21 | Conical segment |
| 22 | Cylindrical segment |
| 23 | Area |
| 24 | Wall thickness |
| 25 | Rotation stop |
| 26 | Outside surface |
| 27 | Inside surface |
| 28 | Opposite surface |
| 29 | Recess |
| 30 | Inclined surface |
| 31 | Inclined surface |
| 32 | Face |
| 33 | Inclined surface |
| α | Angle |

The invention claimed is:

1. A replaceable drill insert configured to be removably attached to a drill shaft, said drill insert comprising:
   a drill tip being configured to cut an object;
   an extending portion being configured to extend into a recess in a drill shaft to removably attach said drill insert to a drill shaft and to hold said drill insert in a drill shaft during drilling;
   said extending portion comprising at least one projection;
   said at least one projection being in the shape of a portion of a screw thread and being disposed to run less than 180 degrees around a section of the perimeter of said extending portion;
   said at least one projection being configured to project into and engage a grooved portion in a recess in a drill shaft; and
   said drill insert being configured to be relatively rotated with a drill shaft, upon insertion of said drill insert into a recess in a drill shaft, less than 180 degrees to engage a grooved portion of a recess in a drill shaft with said at least one projection to screw together said drill insert and a drill shaft to tighten and sufficiently firmly seat said drill insert in a drill shaft to prepare a drill for drilling; and said at least one projection forms a substantial portion of said extending portion.

2. The replaceable drill insert according to claim 1, wherein:
said extending portion comprises at least one non-threaded mating surface disposed between said drill tip and said at least one projection;
said at least one mating surface forms a substantial portion of said extending portion along the longitudinal axis of said extending portion; and
said at least one mating surface is configured to contact a substantial portion of a complementary non-threaded mating surface in a recess in a drill shaft.

3. The replaceable drill insert according to claim 1, wherein:
said at least one projection is in the shape of a portion of an asymmetrical screw thread;
said at least one projection has a first surface and a second surface disposed at an angle with respect to each other;
said first surface is disposed to make a first angle with respect to the longitudinal axis of said extending portion;
said second surface is disposed to make a second angle with respect to the longitudinal axis of said extending portion; and
said first angle is greater than said second angle.

4. The replaceable drill insert according to claim 3, wherein said at least one projection comprises solely two projections disposed opposite and separate from one another on said extending portion.

5. The replaceable drill insert according to claim 4, wherein:
said first surface is disposed to slope axially toward said drill tip;
said first surface is configured to engage a first complementary surface of a groove of a recess of a drill shaft;
said drill insert has a central longitudinal axis configured to be aligned with a central longitudinal axis of a drill shaft;
said drill insert comprises a bearing surface disposed about said extending portion and transverse to said central longitudinal axis;
said bearing surface is configured to be complementary to an end face of a drill shaft disposed about a recess and is configured to be disposed to contact and rest against the shaft end face;
said extending portion comprises a flat end face configured to engage a complementary bottom surface of a recess in a drill shaft;
said extending portion comprises at least one other non-threaded mating surface disposed between said second surface and said end face;
said at least one other mating surface is configured to contact a substantial portion of a complementary non-threaded mating surface in a recess in a drill shaft;
said bearing surface comprises a recess configured to engage a complementary rotation stop surface which projects from the end face of the drill shaft; and
said first surface forms an angle with respect to said central longitudinal axis of 90° to 45°.

6. The replaceable drill insert according to claim 5, wherein said first surface forms an angle with respect to said central longitudinal axis of 60°.

7. A replaceable drill insert configured to be removably attached to a drill shaft, said drill insert comprising:
a drill tip being configured to cut an object;
an extending portion being configured to extend into a recess in a drill shaft to removably attach said drill insert to a drill shaft and to hold said drill insert in a drill shaft during drilling;
said extending portion comprising solely two projections disposed opposite and separate from one another;
each of said two projections being in the shape of a portion of a screw thread and being disposed to run less than 180 degrees around a section of the perimeter of said extending portion;
each of said two projections being configured to project into and engage a corresponding grooved portion in a recess in a drill shaft; and
said drill insert being configured to be relatively rotated with a drill shaft, upon insertion of said drill insert into a recess in a drill shaft, less than 180 degrees to engage a grooved portion of a recess in a drill shaft with a corresponding one of said projections to screw together said drill insert and a drill shaft to tighten and sufficiently firmly seat said drill insert in a drill shaft to prepare a drill for drilling.

8. The replaceable drill insert according to claim 7, wherein said projections form a substantial portion of said extending portion.

9. The replaceable drill insert according to claim 8, wherein:
said extending portion comprises two non-threaded mating surfaces disposed between said drill tip and a corresponding one of said projections;
said mating surfaces form a substantial portion of said extending portion along the longitudinal axis of said extending portion; and
said mating surfaces are configured to contact a substantial portion of complementary non-threaded mating surfaces in a recess in a drill shaft.

10. The replaceable drill insert according to claim 9, wherein:
said first surface is disposed to slope axially toward said drill tip;
said first surface is configured to engage a first complementary surface of a groove of a recess of a drill shaft;
said drill insert has a central longitudinal axis configured to be aligned with a central longitudinal axis of a drill shaft;
said drill insert comprises a bearing surface disposed about said extending portion and transverse to said central longitudinal axis;
said bearing surface is configured to be complementary to an end face of a drill shaft disposed about a recess and is configured to be disposed to contact and rest against the shaft end face;
said extending portion comprises a flat end face configured to engage a complementary bottom surface of a recess in a drill shaft;
said extending portion comprises at least one other non-threaded mating surface disposed between said second surface and said end face;
said at least one other mating surface is configured to contact a substantial portion of a complementary non-threaded mating surface in a recess in a drill shaft;
said bearing surface comprises a recess configured to engage a complementary rotation stop surface which projects from the end face of the drill shaft; and said first surface forms an angle with respect to said central longitudinal axis of 90° to 45°.

11. The replaceable drill insert according to claim 10, wherein said first surface forms an angle with respect to said central longitudinal axis of 60°.

12. The combination of a drill shaft and said replaceable drill insert according to claim 7 to form a drill, wherein:
said replaceable drill insert is removably attached to said drill shaft;
said combination comprises at least one chip flute;
said at least one chip flute comprises a first chip flute portion disposed on said shaft and a second chip flute portion disposed on said replaceable drill insert;
said shaft comprises a recess configured and disposed to receive said replaceable drill insert and to hold said replaceable drill insert during drilling;
said recess of said shaft comprises two grooved portions;
each of said grooved portions is disposed to run less than 180 degrees around a section of the interior of said recess and is engaged by said two projections; and
said replaceable drill insert and said shaft are configured to be relatively rotated, upon insertion of said replaceable drill insert into said recess, substantially less than 180 degrees to engage said two grooved portions, in a screwing motion, with said two projections to screw together said replaceable drill insert and said shaft to tighten and sufficiently firmly seat said replaceable drill insert in said recess to prepare the drill for drilling.

13. The combination according to claim 12, wherein:
said combination comprises a twist drill;
said shaft comprises a first end and a second end disposed opposite said first end;
said first end of said shaft comprises a shank portion configured to be inserted into and held by a chuck;
said at least one chip flute comprises at least a first chip flute and a second chip flute;
said second end of said shaft comprises said recess;
said recess comprises a bottom wall and two side walls disposed to extend in a substantially axial direction away from said bottom wall;
each of said two grooved portions is disposed in a corresponding one of said two side walls;
the shape of said grooved portions of said recess is complementary to the shape of said two projections of said extending portion;
each of said two grooved portions is disposed to run substantially less than 180 degrees around a section of its corresponding side wall from said first chip flute to said second chip flute;
said two projections form a substantial portion of said extending portion;
said extending portion comprises two non-threaded mating surfaces disposed between said drill tip and a corresponding one of said projections;
said mating surfaces form a substantial portion of said extending portion along the longitudinal axis of said extending portion;
said mating surfaces are configured and disposed to contact a
substantial portion of complementary non-threaded mating surfaces in said recess in said drill shaft;
said first surface is disposed to slope axially toward said drill tip;
said first surface is configured and disposed to engage a first complementary surface of said grooves of said recess of said drill shaft;
said drill shaft has a central longitudinal axis;

said drill insert has a central longitudinal axis configured to be aligned with said central longitudinal axis of said drill shaft;
said drill insert comprises a bearing surface disposed about said extending portion and transverse to said central longitudinal axis;
said shaft comprises an end face disposed about said recess;
said bearing surface is complementary to said end face of said drill shaft disposed about said recess and is configured and disposed to contact and rest against said shaft end face;
said extending portion comprises a flat end face configured and disposed to engage said bottom wall of said recess;
said extending portion comprises at least one other non-threaded mating surface disposed between said second surface and said end face;
said at least one other mating surface is configured and disposed to contact a substantial portion of a complementary non-threaded mating surface in said recess in said drill shaft;
said bearing surface comprises a recess configured and disposed to engage a complementary rotation stop surface which projects from said end face of said drill shaft; and
said first surface forms an angle with respect to said central longitudinal axis of 90° to 45°.

14. The combination according to claim 13, wherein said first surface forms an angle with respect to said central longitudinal axis of 60°.

15. A replaceable drill insert configured to be removably attached to a drill shaft, said drill insert comprising:
a drill tip being configured to cut an object;
an extending portion being configured to extend into a recess in a drill shaft to removably attach said drill insert to a drill shaft and to hold said drill insert in a drill shaft during drilling;
said extending portion comprising at least one projection;
said at least one projection being in the shape of a portion of a screw thread and being disposed to run less than 180 degrees around a section of the perimeter of said extending portion;
said extending portion comprising at least one non-threaded mating surface disposed between said drill tip and said at least one projection;
said at least one mating surface forming a substantial portion of said extending portion along the longitudinal axis of said extending portion;
said at least one mating surface being configured to contact a substantial portion of a complementary non-threaded mating surface in a recess in a drill shaft;
said at least one projection being configured to project into and engage a grooved portion in a recess in a drill shaft; and
said drill insert being configured to be relatively rotated with a drill shaft, upon insertion of said drill insert into a recess in a drill shaft, less than 180 degrees to engage a grooved portion of a recess in a drill shaft with said at least one projection to screw together said drill insert and a drill shaft to tighten and sufficiently firmly seat said drill insert in a drill shaft to prepare a drill for drilling.

16. The replaceable drill insert according to claim 15, wherein said at least one projection comprises solely two projections disposed opposite and separate from one another on said extending portion.

17. The replaceable drill insert according to claim 16, wherein:
- each of said projections are in the shape of a portion of an asymmetrical screw thread;
- each of said projections has a first surface and a second surface disposed at an angle with respect to each other;
- said first surface is disposed to make a first angle with respect to the longitudinal axis of said extending portion;
- said second surface is disposed to make a second angle with respect to the longitudinal axis of said extending portion; and
- said first angle is greater than said second angle.

18. The replaceable drill insert according to claim 17, wherein:
- said first surface is disposed to slope axially toward said drill tip;
- said first surface is configured to engage a first complementary surface of a groove of a recess of a drill shaft;
- said drill insert has a central longitudinal axis configured to be aligned with a central longitudinal axis of a drill shaft;
- said drill insert comprises a bearing surface disposed about said extending portion and transverse to said central longitudinal axis;
- said bearing surface is configured to be complementary to an end face of a drill shaft disposed about a recess and is configured to be disposed to contact and rest against the shaft end face;
- said extending portion comprises a flat end face configured to engage a complementary bottom surface of a recess in a drill shaft;
- said extending portion comprises at least one other non-threaded mating surface disposed between said second surface and said end face;
- said at least one other mating surface is configured to contact a substantial portion of a complementary non-threaded mating surface in a recess in a drill shaft;
- said bearing surface comprises a recess configured to engage a complementary rotation stop surface which projects from the end face of the drill shaft; and
- said first surface forms an angle with respect to said central longitudinal axis of 90° to 45°.

19. The replaceable drill insert according to claim 18, wherein said first surface forms an angle with respect to said central longitudinal axis of 60°.

20. The combination of a drill shaft and said replaceable drill insert according to claim 15 to form a drill, wherein:
- said replaceable drill insert is removably attached to said drill shaft;
- said combination comprises at least one chip flute;
- said at least one chip flute comprises a first chip flute portion disposed on said shaft and a second chip flute portion disposed on said replaceable drill insert;
- said shaft comprises a recess configured and disposed to receive said replaceable drill insert and to hold said replaceable drill insert during drilling;
- said recess of said shaft comprises at least one grooved portion;
- said at least one grooved portion is disposed to run less than 180 degrees around a section of the interior of said recess and is engaged by said at least one projection; and
- said replaceable drill insert and said shaft are configured to be relatively rotated, upon insertion of said replaceable drill insert into said recess, substantially less than 180 degrees to engage said at least one grooved portion, in a screwing motion, with said at least one projection to screw together said replaceable drill insert and said shaft to tighten and sufficiently firmly seat said replaceable drill insert in said recess to prepare the drill for drilling.

21. The combination according to claim 20, wherein:
- said combination comprises a twist drill;
- said shaft comprises a first end and a second end disposed opposite said first end;
- said first end of said shaft comprises a shank portion configured to be inserted into and held by a chuck;
- said at least one chip flute comprises at least a first chip flute and a second chip flute;
- said second end of said shaft comprises said recess;
- said recess comprises a bottom wall and at least one side wall disposed to extend in a substantially axial direction away from said bottom wall;
- said shaft comprises an end face disposed about said recess;
- said at least one side wall comprises said at least one grooved portion;
- the shape of said at least one grooved portion of said recess is complementary to the shape of said at least one projection of said extending portion;
- said at least one grooved portion is disposed to run substantially less than 180 degrees around a section of said at least one side wall from said first chip flute to said second chip flute;
- said at least one projection is in the shape of a portion of an asymmetrical screw thread;
- said at least one projection has a first surface and a second surface disposed at an angle with respect to each other;
- said first surface is disposed to make a first angle with respect to the longitudinal axis of said extending portion;
- said second surface is disposed to make a second angle with respect to the longitudinal axis of said extending portion;
- said first angle is greater than said second angle;
- said first surface is disposed to slope axially toward said drill tip;
- said first surface is configured and disposed to engage a first complementary surface of said at least one grooved portion of said recess;
- said drill shaft has a central longitudinal axis;
- said replaceable drill insert has a central longitudinal axis configured and disposed to be aligned with said central longitudinal axis of said drill shaft;
- said replaceable drill insert comprises a bearing surface disposed about said extending portion and transverse to said central longitudinal axis;
- said bearing surface is configured to be complementary to said end face of said drill shaft and is configured and disposed to contact and rest against said shaft end face;
- said extending portion comprises a flat end face configured and disposed to engage said bottom wall of said recess;
- said extending portion comprises at least one other non-threaded mating surface disposed between said second surface and said end face;
- said at least one other mating surface is configured to contact a substantial portion of a complementary non-threaded mating surface in said recess;
- said bearing surface comprises a recess configured and disposed to engage a complementary rotation stop surface which projects from said end face of said drill shaft;

said first surface forms an angle with respect to said central longitudinal axis of 90° to 45°; and said at least one projection comprises solely two projections disposed opposite and separate from one another on said extending portion.

22. A twist drill comprising:

a drill shaft;

a replaceable drill insert being removably attached to said drill shaft;

at least one chip flute;

said at least one chip flute comprising a first chip flute portion disposed on said shaft and a second chip flute portion disposed on said replaceable drill insert;

said drill shaft comprising a recess configured and disposed to receive said replaceable drill insert and to hold said replaceable drill insert during drilling;

said replaceable drill insert comprising:
  a drill tip being configured to cut an object; and
  an extending portion being configured to extend into said recess in said drill shaft to removably attach said drill insert to said drill shaft and to hold said drill insert in said drill shaft during drilling;

said extending portion comprising at least one projection;

said at least one projection being in the shape of a portion of a screw thread and being disposed to run less than 180 degrees around a section of the perimeter of said extending portion;

said recess of said drill shaft comprising at least one grooved portion;

said at least one grooved portion being disposed to run less than 180 degrees around a section of the interior of said recess;

said at least one projection being configured and disposed to project into and engage said at least one grooved portion in said recess in said drill shaft;

said replaceable drill insert and said drill shaft being configured to be relatively rotated, upon insertion of said replaceable drill insert into said recess, substantially less than 180 degrees to engage said at least one grooved portion, in a screwing motion, with said at least one projection to screw together said replaceable drill insert and said drill shaft to tighten and sufficiently firmly seat said replaceable drill insert in said recess to prepare said twist drill for drilling;

said drill shaft has a central longitudinal axis;

said replaceable drill insert has a central longitudinal axis configured to be aligned with said central longitudinal axis of said drill shaft;

said shaft comprises a first end and a second end disposed opposite said first end;

said first end of said shaft comprises a shank portion configured to be inserted into and held by a chuck;

said at least one chip flute comprises at least a first chip flute and a second chip flute;

said second end of said shaft comprises said recess;

said recess comprises a bottom wall and at least one side wall disposed to extend in a substantially axial direction away from said bottom wall;

said extending portion of said replaceable drill insert comprises a flat end face configured and disposed to engage said bottom wall of said recess;

said drill shaft comprises an end face disposed about said recess;

said replaceable drill insert comprises a bearing surface disposed about said extending portion and transverse to said central longitudinal axis;

said bearing surface is configured to be complementary to said end face of said drill shaft and is configured and disposed to contact and rest against said shaft end face;

said at least one side wall comprises said at least one grooved portion;

the shape of said at least one grooved portion of said recess is complementary to the shape of said at least one projection of said extending portion;

said at least one grooved portion is disposed to run substantially less than 180 degrees around a section of said at least one side wall from said first chip flute to said second chip flute;

said at least one projection is disposed to run substantially less than 180 degrees around a section of the perimeter of said extending portion from said first chip flute to said second chip flute;

said at least one projection forms a substantial portion of said extending portion;

said extending portion comprises at least one non-threaded mating surface disposed between said drill tip and said at least one projection;

said at least one mating surface forms a substantial portion of said extending portion along the longitudinal axis of said extending portion;

said at least one mating surface is configured and disposed to contact a substantial portion of a complementary non-threaded mating surface in said recess;

said at least one projection is in the shape of a portion of an asymmetrical screw thread;

said at least one projection has a first surface and a second surface disposed at an angle with respect to each other;

said first surface is disposed to make a first angle with respect to the longitudinal axis of said extending portion;

said second surface is disposed to make a second angle with respect to the longitudinal axis of said extending portion;

said first angle is greater than said second angle;

said first surface is disposed to slope axially toward said drill tip;

said first surface is configured and disposed to engage a first complementary surface of said at least one grooved portion of said recess;

said extending portion comprises at least one other non-threaded mating surface disposed between said second surface and said end face;

said at least one other mating surface is configured to contact a substantial portion of a complementary non-threaded mating surface in said recess;

said bearing surface comprises a recess configured to engage a complementary rotation stop surface which projects from said end face of said drill shaft;

said first surface forms an angle with respect to said central longitudinal axis of 90° to 45°; and said at least one projection comprises solely two projections disposed opposite and separate from one another on said extending portion.

23. The twist drill according to claim 22, wherein said first surface forms an angle with respect to said central longitudinal axis of 60°.

* * * * *